United States Patent [19]

Taghadoss

[11] Patent Number: 6,052,722
[45] Date of Patent: *Apr. 18, 2000

[54] SYSTEM AND METHOD FOR MANAGING NETWORK RESOURCES USING DISTRIBUTED INTELLIGENCE AND STATE MANAGEMENT

[75] Inventor: Mehdi Taghadoss, Cary, N.C.

[73] Assignee: MCI Communications Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/813,724

[22] Filed: Mar. 7, 1997

[51] Int. Cl.[7] .............................. G06F 13/38; G06F 15/17
[52] U.S. Cl. ........................................ 709/223; 709/224
[58] Field of Search ...................... 395/200.53, 200.54; 709/223, 224, 226, 202

[56] References Cited

U.S. PATENT DOCUMENTS

| | | | |
|---|---|---|---|
| 4,937,825 | 6/1990 | Ballard et al. | 371/20.1 |
| 5,031,211 | 7/1991 | Nagal et al. | 379/211 |
| 5,157,667 | 10/1992 | Carusone, Jr. et al. | 371/29.1 |
| 5,189,674 | 2/1993 | Shimizu | 370/20.1 |
| 5,204,955 | 4/1993 | Kagel et al. | 395/185.08 |
| 5,233,600 | 8/1993 | Pekarske | 370/14 |
| 5,261,044 | 11/1993 | Dev et al. | 395/200.53 |
| 5,299,201 | 3/1994 | Carusone, Jr. et al. | 371/51 |
| 5,303,243 | 4/1994 | Anezaki | 395/200.53 |
| 5,412,652 | 5/1995 | Lu | 370/85.12 |
| 5,436,909 | 7/1995 | Dev et al. | 371/20.1 |
| 5,452,306 | 9/1995 | Turudic et al. | 370/110.1 |
| 5,455,832 | 10/1995 | Bowmaster | 371/20.1 |
| 5,463,634 | 10/1995 | Smith et al. | 371/20.6 |
| 5,483,520 | 1/1996 | Eychenne et al. | 370/16.1 |
| 5,504,921 | 4/1996 | Dev et al. | 395/200.53 |
| 5,566,162 | 10/1996 | Gruber et al. | 370/13 |
| 5,634,010 | 5/1997 | Ciscon et al. | 395/200.53 |

(List continued on next page.)

OTHER PUBLICATIONS

Banerjee et al., "ISDN Primary Rate Access Maintenance," *IEEE*, 1989, pp. 2.6.1–2.6.5.

Cadieux et al., "A New Network Element for Performance Monitoring and Test Access Spanning the Digital Hierarchy," *IEEE*, 1990, pp. 324.4.1–334.4.5.

Kerschberg et al., "Intelligent Network Management: A Heterogeneous Knowledge Source Approach," *IEEE*, 1990, pp. 314–316.

Mageed et al., "Fault Detection and Identification Using a Hierarchial Neural Network–Based System," *IEEE*, 1993, pp. 338–343.

"Digital Networks: Architectures of Transport Networks Based on the Synchronous Digital Hierarchy (SDH)," *International Telecommunication Union*, Mar. 1993, pp. 1–57.

"Revised Draft Recommentation (M.3100), Generic Network Information Model," *International Telecommunication Union*, Jan. 17, 1997, pp. 1–87.

"General Aspects of Digital Transmission Systems; Terminal Equipments: Synchronous Digital Hierarchy (SDH) Management Information Model for the Network Element View," *International Telecommunication Union*, Sep. 1992, pp. 1–103.

*Primary Examiner*—Mark H. Rinehart

[57] ABSTRACT

A system and method for managing network resources using distributed intelligence and state management is described. Individual entities are defined for each managed network resource. A plurality of entities in one or more levels of a network management system are organized based upon association and containment relationships. Each of the individual entities has an associated state value. State changes are propagated between the individual entities through state change notifications. Upon receipt of a state change notification, an entity determines whether its own state is affected. An entity can also initiate actions to improve its state.

20 Claims, 14 Drawing Sheets

U.S. PATENT DOCUMENTS

| | | | |
|---|---|---|---|
| 5,651,006 | 7/1997 | Fujino et al. | 395/200.53 |
| 5,655,081 | 8/1997 | Bonnell et al. | 709/202 |
| 5,696,697 | 12/1997 | Blau et al. | 707/103 |
| 5,704,036 | 12/1997 | Brownmiller et al. | 395/183.19 |
| 5,726,979 | 3/1998 | Henderson et al. | 370/254 |
| 5,740,357 | 4/1998 | Gardiner et al. | 395/200.53 |
| 5,751,962 | 5/1998 | Fanshier et al. | 395/200.53 |
| 5,758,083 | 5/1998 | Singh et al. | 709/223 |
| 5,761,428 | 6/1998 | Sidey | 709/223 |
| 5,768,255 | 6/1998 | Brownmiller et al. | 370/248 |
| 5,778,184 | 7/1998 | Brownmiller et al. | 395/200.54 |
| 5,784,359 | 7/1998 | Bencheck et al. | 370/244 |
| 5,787,074 | 7/1998 | Brownmiller et al. | 370/244 |
| 5,796,723 | 8/1998 | Bencheck et al. | 370/252 |
| 5,799,153 | 8/1998 | Blau et al. | 395/200.53 |
| 5,826,239 | 10/1998 | Du et al. | 705/8 |
| 5,848,244 | 12/1998 | Wilson | 395/200.51 |
| 5,872,931 | 2/1999 | Chivaluri | 709/223 |

SYSTEM AND METHOD FOR MANAGING NETWORK RESOURCES USING DISTRIBUTED INTELLIGENCE AND STATE MANAGEMENT

BACKGROUND OF THE INVENTION

1. Field of the Invention

The present invention relates generally to network management systems, and more specifically is directed toward management of network resources using distributed intelligence and state management.

2. Related Art

Telecommunication service providers (e.g., MCI Telecommunications Corporation) provide a wide range of services to their customers. These services range from the transport of a standard 64 kbit/s voice channel (i.e., DS0 channel) or subrate thereof to the transport of higher rate digital data services (e.g., video). Both voice channels and digital data services are transported over the network via a hierarchy of digital signal transport levels. For example, in a conventional digital signal hierarchy 24 DS0 channels are mapped into a DS1 channel. In turn, 28 DS1 channels are mapped into a DS3 channel.

Routing of these DS1 and DS3 channels within a node of the network is generally performed by crossconnect functions. Multiplexing and transmission of channels between nodes is typically provided via fiber-optic transmission systems. Fiberoptic transmission systems can multiplex a plurality of DSn channels into a higher rate transmission over a single pair of fibers. In one example, signal formats for the fiber-optic transmission systems are defined by the manufacturer. These proprietary systems are referred to as asynchronous transmission systems.

Alternatively, a fiber-optic transmission system can implement the synchronous optical network (SONET) standard or the counterpart synchronous digital hierarchy (SDH) standard. The SONET standard defines a synchronous transport signal (STS) frame structure that includes overhead bytes and a synchronous payload envelope (SPE). One or more channels (e.g., DS1 and DS3 channels) can be mapped into a SPE. For example, a single DS3 channel can be mapped into a single STS-1 frame. Alternatively, 28 DS1 channels can be mapped into virtual tributaries (VTs) within a single STS-1 frame.

Various STS-1 frames can be concatenated to produce higher rate SONET signals. For example, a STS-12 signal includes 12 STS-1 frames, while a STS-48 signal includes 48 STS-1 frames. Finally, after an STS signal is converted from electrical to optical, it is known as an optical carrier (OC) signal (e.g., OC-12 and OC-48).

An end-to-end path of a provisioned channel within a network typically traverses a plurality of nodes. This provisioned channel is carried over transmission facilities that operate at various rates in the digital signal hierarchy. For example, a provisioned DS1 channel may exist as part of a DS3, VT1.5, STS-1, STS-12, OC-12, and OC-48 signal along parts of the end-to-end path. This results due to the multiplexing and demultiplexing functions at each of the nodes.

One of the goals of a network management system is to monitor the performance of the provisioned channel. Performance of the provisioned channel can include various measures. One measure is the unavailability of the provisioned channel. Unavailability is generally defined as the amount (or fraction) of time that a channel is not operational. Various causes such as cable cuts can lead to channel downtime. Network responses to channel downtime can include automatic protection switching or various restoration procedures (e.g., digital cross-connect distributed restoration).

Although unavailability is a major performance measure from a customer's standpoint, other performance measures can also be critical. For example, if a customer desires a digital data service for the transmission of financial data, the number of errored seconds or severely errored seconds may be a concern.

One of the most fundamental challenges facing network management systems is the identification of an accurate representation of the condition (or state) of the network. In particular, the network management system is concerned with the state of the physical hardware contained in the network elements under its supervision. The state of the physical hardware is used to infer the state of logical network services which the network elements provide.

More specifically, network management systems rely on the centralized reception, filtering, and correlation of alarms and performance information from the network elements. In one example, the individual network elements combine to forward several million alarm/performance messages to the network management system for subsequent analysis. To reduce the amount of processing required, the centralized network management application may provide a filtering function that can correlate alarms, thereby reducing the number of alarm messages from several million to possibly several hundred thousands. After this filtering function is performed, the alarm/performance information is analyzed to identify root causes of the alarms and determine the associated condition of the network. As one can readily appreciate, this solution to network management is time consuming, processing resource intensive, and unscalable.

SUMMARY OF THE INVENTION

The present invention satisfies the above mentioned needs by providing a comprehensive network management system that can efficiently and accurately identify the state of physical and logical managed network resources. One example of a managed network resource is the physical hardware contained within a single network element. Other examples of network resources include subnetworks, networks, service offerings, end-to-end paths, customers, etc.

In the present invention, a plurality of entities are defined for a plurality of managed network resources which include physical (e.g., network element hardware) and logical (e.g., circuit termination points) resources. Generally, an entity is a holder of a unit of information (e.g., operational state information) related to an associated managed network resource. In a preferred embodiment, the entity is implemented as a software object.

Organization of the entities (or objects) is effected through a hierarchial structure defined by object relationships. Examples of these object relationships are containment relationships and association relationships. The objects in the network management system of the present invention implement a form of distributed intelligence. One aspect of the distributed intelligence is the ability for objects to communicate between themselves. These communications include state change notifications. State change notifications function to communicate a sending object's change of state to a receiving object and to communicate a root cause or probable root cause of the change of state.

Another aspect of the distributed intelligence is an object's responsibility for managing/updating its own internal state. If a state change occurs, an object identifies one or more other objects that can be affected by this state change. Each affected object that receives a state change notification then determines if the state change occurring in the supporting object results in a state change to itself. If the object determines that its state is changed due to the supporting object's state change, it updates its state and continues the propagation process. This update of object state and forwarding of state change notifications continues until there are no other objects that are affected.

A further aspect of the distributed intelligence is represented by an object's ability to take action to improve its state or to rectify a condition. In this autonomous action, an object can initiate management actions to test a particular managed network resource. The object can also initiate network restoration procedures, send alarms to trigger human action, etc.

BRIEF DESCRIPTION OF THE FIGURES

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The operation and administration of a service provider's network is becoming increasingly complex. Network elements continue to evolve in support of the provision of a wider range of services. The overriding goal of network management is to ensure that all aspects of the network are operating according to both the service provider's design and the customer's expectations.

Figure 1:
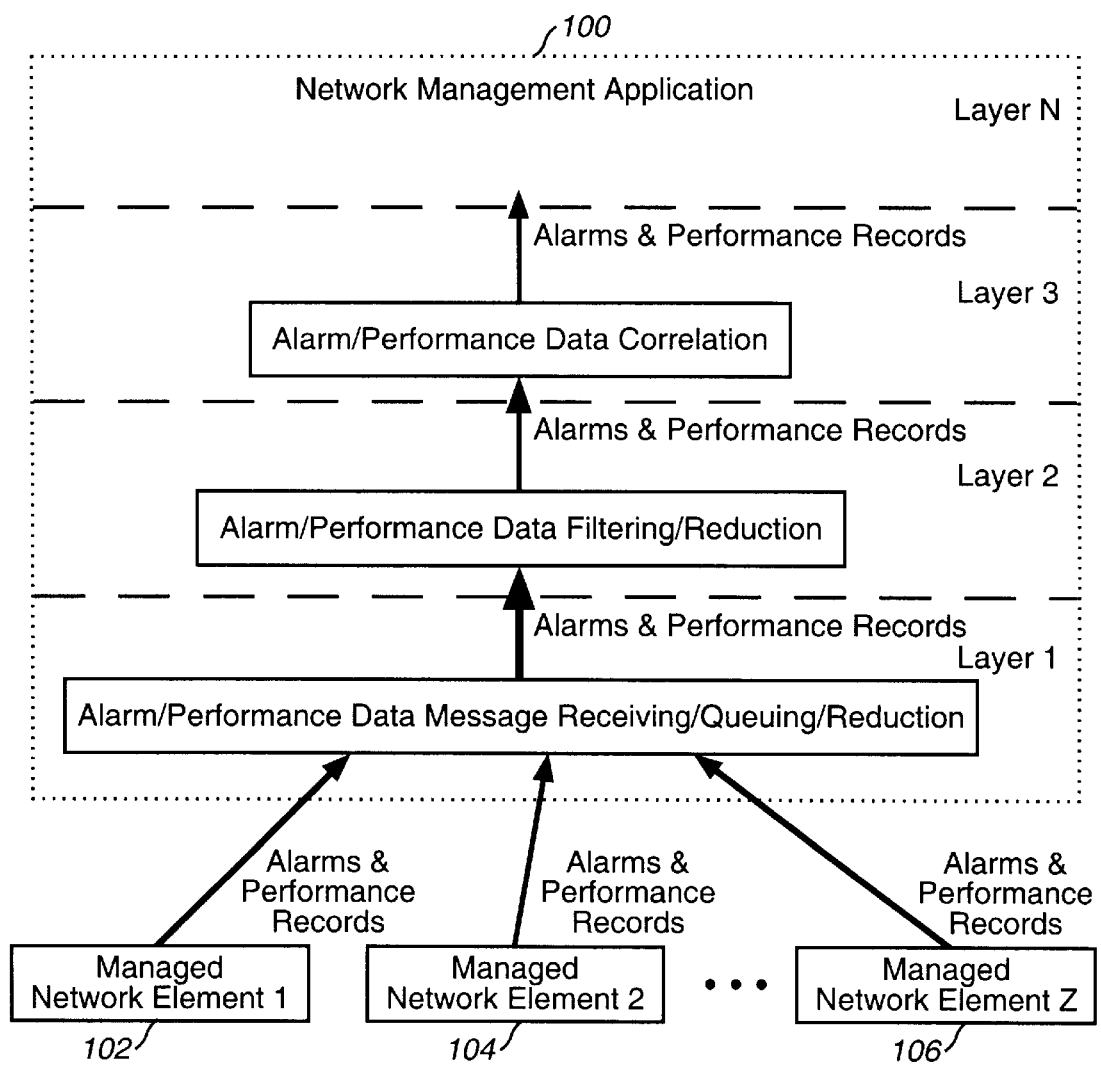
FIG. 1 illustrates a network management system that passes alarm and performance records between layers.

FIG. 1 illustrates an example of a network management system 100 that includes a plurality of layers 1 through N. The plurality of layers can be arbitrarily defined for a particular network management application. One example of a network management system 100 is the International Telecommunications Union (ITU)—Telecommunications Management Network (TMN) standard. The ITU-TMN standard is an open-ended framework designed for a service provider to implement its own network management process.

In this example standard, the network management system includes a network element layer (NEL), an element management layer (EML), a network management layer (NML), a service management layer (SML), and a business management layer (BML). In this framework, managed network elements (NEs) 102, 104, 106 represent a physical layer of the network represented by the NEL. Each of managed NEs 102, 104, 106 can be designed to provide alarm and performance information to an element manager in the EML. Managers in the EML forward alarm and performance information to managers in the NML. Generally, the managers in the NML can be defined on a national level while managers in the EML can be defined on a local level.

In the SML, applications can be defined for provisioning, accounting/billing, security, network performance, fault management, etc. Finally, the BML represents the general corporate policy that dictates the general business and contractual arrangements of the service provider.

In operation, network management system 100 is designed to receive a plurality of alarm and performance related information from the various managed NEs 102, 104, 106. The alarm and performance records provide the network management system with information concerning the current status and integrity of the various network resources under its control. Examples of alarm and performance records include a line alarm indication signal (AIS), path AIS, loss of signal, loss of frame, bit error rate (BER), severely errored seconds (SES), etc.

As further illustrated by FIG. 1, all of the alarm and performance records that are forwarded by the managed NEs 102, 104, 106 are received by a next highest layer of network management system 100. As one can readily appreciate, the various alarm and performance records that are forwarded by managed NEs 102, 104, 106 can include a significant number of redundancies. These redundancies result because various alarms can describe the same or similar network problems.

For example, assume that a fiber optic link exists between managed NEs 102 and 104. If this fiber optic link is cut, managed NEs 102 and 104 would both experience a service interruption. Based upon this independent discovery, each managed NE 102 and 104 would forward an alarm to layer 1 of network management system 100. As both forwarded alarms describe the same problem, layer 1 of network management system 100 can discard one of those alarm records. Layer 1 may then forward only one alarm record to layer 2 in network management system 100. Note that similar reductions of alarms can occur at each subsequent layer in network management system 100.

In another example, performance records and alarms can also be reduced by correlation of network events. In this scenario, two alarms reported by different NEs 102, 104, 106 may be indicative of the same problem, yet describing a different symptom of that problem. Through various algorithms, network management system 100 can correlate the two alarms and forward a single alarm to the next highest layer.

In operation, network management system 100 typically receives alarms and performance records that are on the order of a few million. By removing redundancies and correlating various alarms, the number of alarms and performance records may be reduced from a few million to a few hundred thousand. Even with this order of magnitude decrease in alarms and performance records, the substantial volume that remains requires a tremendous amount of processing power. In most implementations, this relative volume continues to hinder the ability of network management system 100 to respond, in real-time or near real-time, to network management queries. More specifically, network management system 100 cannot guarantee that a response will be returned within a given time T. With this fundamental limitation, the relevant service provider is limited in its ability to proactively respond to potential network problems. Customer service is therefore compromised.

A further deficiency in network management system 100, is the accuracy of the actual processing of alarms and performance records. After various reductions and correlations are performed, there is no guarantee that the actual result is an accurate indication of the current state of the network. This limitation greatly affects the service provider's ability to provide the best possible service to a given client. To improve upon these various deficiencies, the present invention is designed to provide an accurate and more efficient way of identifying the actual state and operational status of managed network resources within a given network. The present invention has the flexibility to efficiently and accurately manage a general class of network resources. One example of a managed network resource is the physical hardware contained within a single network element. Other examples of network resources include subnetworks, networks, service offerings, end-to-end paths, customers, etc. It should be noted that the concepts described herein can be applied to any management system that monitors and controls network resources within a given network.

Figure 2:
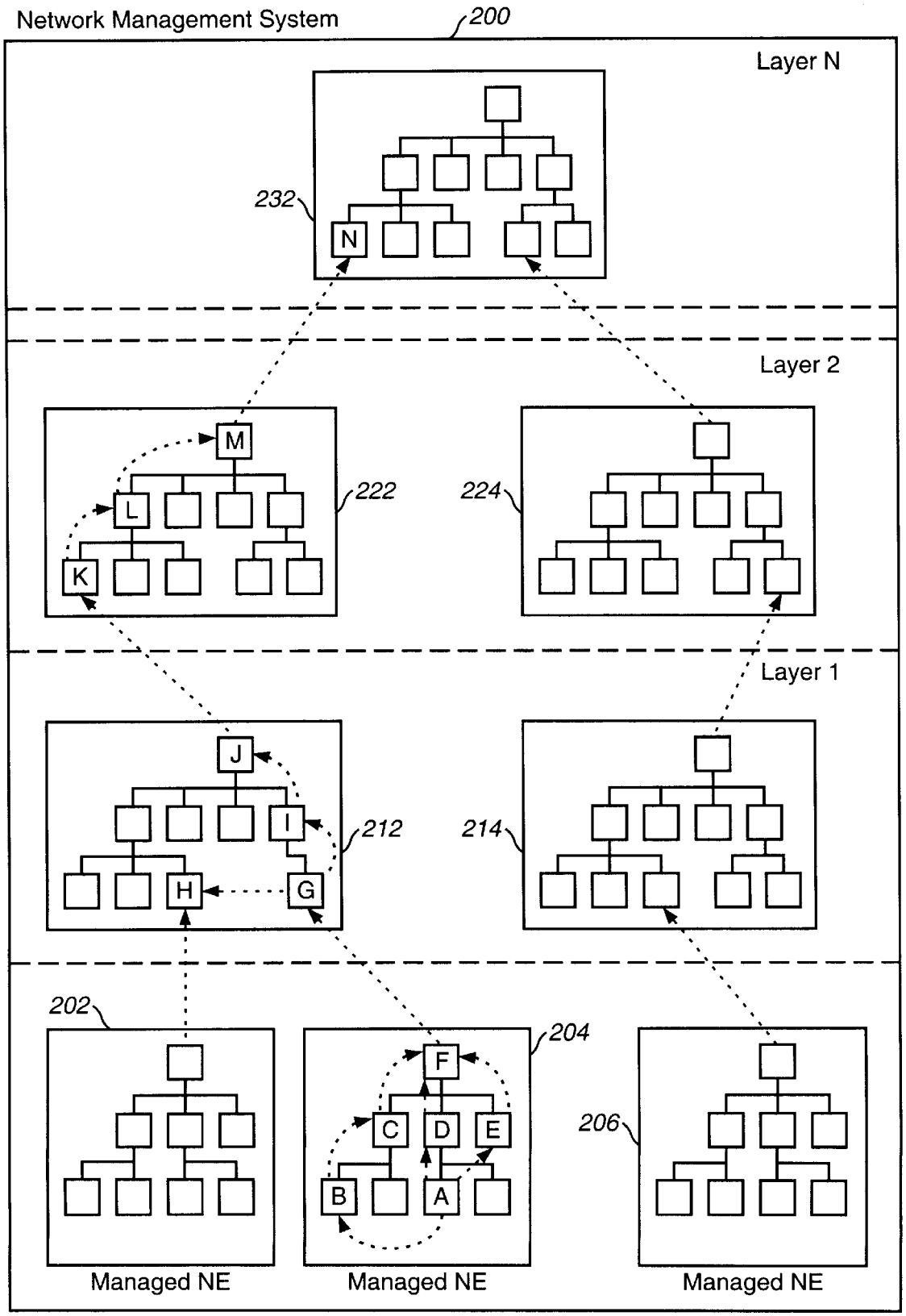
FIG. 2 illustrates a network management system according to one embodiment of the present invention.

FIG. 2 illustrates a layered network management system 200 in accordance with the concepts of the present invention. In a similar manner to network management system 100, the lowest level of the network management system 200 includes managed NEs 202, 204, 206. The next highest layer, layer 1, includes managers 212 and 214. The domain of managers 212 and 214 can represent geographical portions of a network. As illustrated in FIG. 2, managed NEs 202 and 204 are within the domain of manager 212. Similarly, managed NE 206 is within the domain of manager 214. Proceeding to the next highest layer in network management system 200, managers 222 and 224 can represent domains on a national network level. Note that the number of levels in a network management system can be arbitrarily defined based upon a given application. At a highest level, layer N, manager 232 can be assigned to service and customer level interests.

Note that this configuration is an example scenario used for the purposes of facilitating discussion. The general concepts of the present invention are applicable to the monitoring and control of arbitrarily defined managed network resources by an implementation dependant network management system.

As further noted in FIG. 2, each NE or manager includes a plurality of objects. Generally, an object represents a real-world managed network resource. Object class specifications define detailed characteristics which instances of that class may exhibit through behavior definitions, attributes, actions and notifications. Behavior definitions are textual descriptions which describe how the object behaves and reacts and possibly how it is related to other objects. Attribute values represent data associated with the object or relationships with other objects. Actions are operations that may be performed on object instances within the system. Finally, notifications are messages emitted to inform the system of events and actions which have affected the particular instance involved. As with any object-oriented system, the concepts of encapsulation and data abstraction or inheritance are used. Inheritance, or the sharing of characteristics such as data and methods are based on a hierarchial relationship.

Each object can represent a particular managed network resource. One example of a managed network resource is a circuit pack contained within a NE. A second example of a managed network resource is a logical termination point for a particular level of multiplexed traffic. One example of a set of object definitions is defined in the context of telecommunications. ITU-T recommendation G.803, Architectures of Transport Network Based on the Synchronous Digital Hierarchy (SDH), ITU-T recommendation M.3100 Generic Network Information Model, and ITU-T recommendation G.774, Synchronous Digital Hierarchy (SDH) Management Information Model for the Network Element View, describe a general framework for object definitions in a telecommunications environment.

The conventional use of objects defined by the ITU-T recommendations is as holders of information. Objects operating as holders of information are designed to function in a manager/agent relation. Generally, both the manager and agent are pieces of software that contain a plurality of objects. The manager software includes the intelligence to query the agent. The agent software, on the other hand, includes the intelligence to respond to a query from a manager. The queries that are produced by the manager software can be in the form of CMIP operations. Examples of CMIP operations are the M-GET and M-SET operations. Note that in this manager/agent relation, the agent generally is not required to include a plurality of objects. Rather, the agent can generally simulate the existence of objects that are the focus of a manager's query.

The present invention extends upon the basic functionality of objects operating in the manager/agent relation by incorporating intelligence within the objects. One aspect of the distributed intelligence is the ability of objects to communicate between themselves. One example of these communications is state change notifications. State change notifications function to communicate a sending object's change of state to a receiving object and to communicate a root cause or probable root cause of the change of state.

Another aspect of the distributed intelligence is an object's responsibility for managing/updating its own internal state. If a state change occurs, an object identifies one or more other objects that can be affected by this state change. Each affected object that receives a state change notification then determines if the state change occurring in the supporting object results in a state change to itself. If the object determines that its state is changed due to the supporting object's state change, it updates its state and continues the propagation process. This update of object state and forwarding of state change notifications continues until there are no other objects that are affected.

In a preferred embodiment, each object can have a comprehensive health state that is in one of the following categories: enabled, disabled, or degraded below service level agreement with an associated customer. In addition, the value for the comprehensive health state for a particular object can also have a confidence factor associated with it, thereby indicating the reliability/accuracy of the state information. Clearly, other types of states may also be associated with each object, but the comprehensive health state as defined above is the most fundamental, directly useable, and meaningful for a network management system. Generally, the comprehensive health state value provides a bottom line indication of the health and condition of a network resource represented by an object. In other embodiments, it can be a compilation or summary of other state and/or status values for that particular object.

A further aspect of the distributed intelligence is an object's ability to initiate certain management actions. One example of a management action is the initiation of a test of a managed network resource. This test may, in turn, be used as an aid in confirming a fault, determining the object state, or determining the confidence factor of the state value.

The object may also initiate a protection switch or other backup action. This management action may ensure that a failed resource is isolated and that service continues uninterrupted. As a further consequence of a network restoration scenario, the object may also ensure that the services are properly reverted to the previously used resources.

With respect to a customer, the object may also generate and route e-mail, or page a corresponding customer and/or customer service representative, field engineer/technician, or other personnel, such that human action may be triggered. This is an example of the increased functionality that is provided by the distributed intelligence produced by the objects. Finally, a object can also produce other actions such as time of day or scheduled grooming of the network. As these examples illustrate, the flexibility provided by the distributed intelligence contained within the objects greatly enhances the ability of the network management system to proactively address and correct any potentially adverse conditions.

As noted above, one of the primary functions of the distributed intelligence of the objects is the ability to propagate state information between themselves. This type of state propagation evidences a general paradigm shift away from alarm management and toward distributed intelligence and state management. Whereas other network management systems were concerned with the general correlation of alarms to identify a state of the network, the present invention ensures that an accurate view of the network is always maintained. State propagation by the objects in the various levels of the network management system increases the speed at which the state of the managed network resources can be accurately identified.

A general form of object propagation is illustrated with reference back to FIG. 2. As illustrated, managed NE 204 includes a plurality of objects. A specific hierarchic structure of the objects in managed NE 204 is dependent upon the specific model used to identify the managed network resources associated with managed NE 204.

Starting at object A, the propagation process begins upon an internal state change within object A. Based on this state change (e.g., enabled to disabled), object A identifies the external objects which may be directly affected by object A's state change. In this illustration, the external objects that can be directly affected by a state change in object A are objects B, D, and E. The propagation from object A to object B illustrates a form of horizontal propagation, whereas the propagation from object A to object E illustrates a form of vertical propagation.

Upon receipt of the state change notification from object A, each of objects B, D and E then determine whether their own internal state is affected. Assuming that each of objects B, D and E undergo a corresponding state change resulting from the receipt of the state change notification from object A, each of objects B, D and E then identify additional objects that could be affected by their own internal state change. As illustrated in FIG. 2, the object propagation continues until object F is reached within managed NE 204.

From object F, a state change notification is then sent to object G in manager 212 in layer 1. Object G correspondingly determines its own internal state change and sends a subsequent state change notification to objects H and I. As further illustrated, state change notifications are propagated from object I to object J and eventually to object K in manager 222 of layer 2. This propagation continues through objects L, M and eventually to object N in manager 232 in layer N. As would be apparent to one of ordinary skill in the relevant art, this example propagation of state change notifications illustrates one possible path from object A in managed NE 204 up to object N in manager 232 in layer N.

Generally, propagation of state change notifications may start from any object and can proceed up, down or laterally with reference to FIG. 2. Additionally, an indication of root cause or probable cause is provided to pinpoint the specific object(s) causing the state change(s). State change propagation can be initiated by a system user, for example, to perform maintenance or to force a restoration or switchover.

Having described a general process for state change propagation, examples of types of object associations are now provided. Generally, object associations identify various paths that state change notifications can take among a hierarchy of objects.

Figure 3:
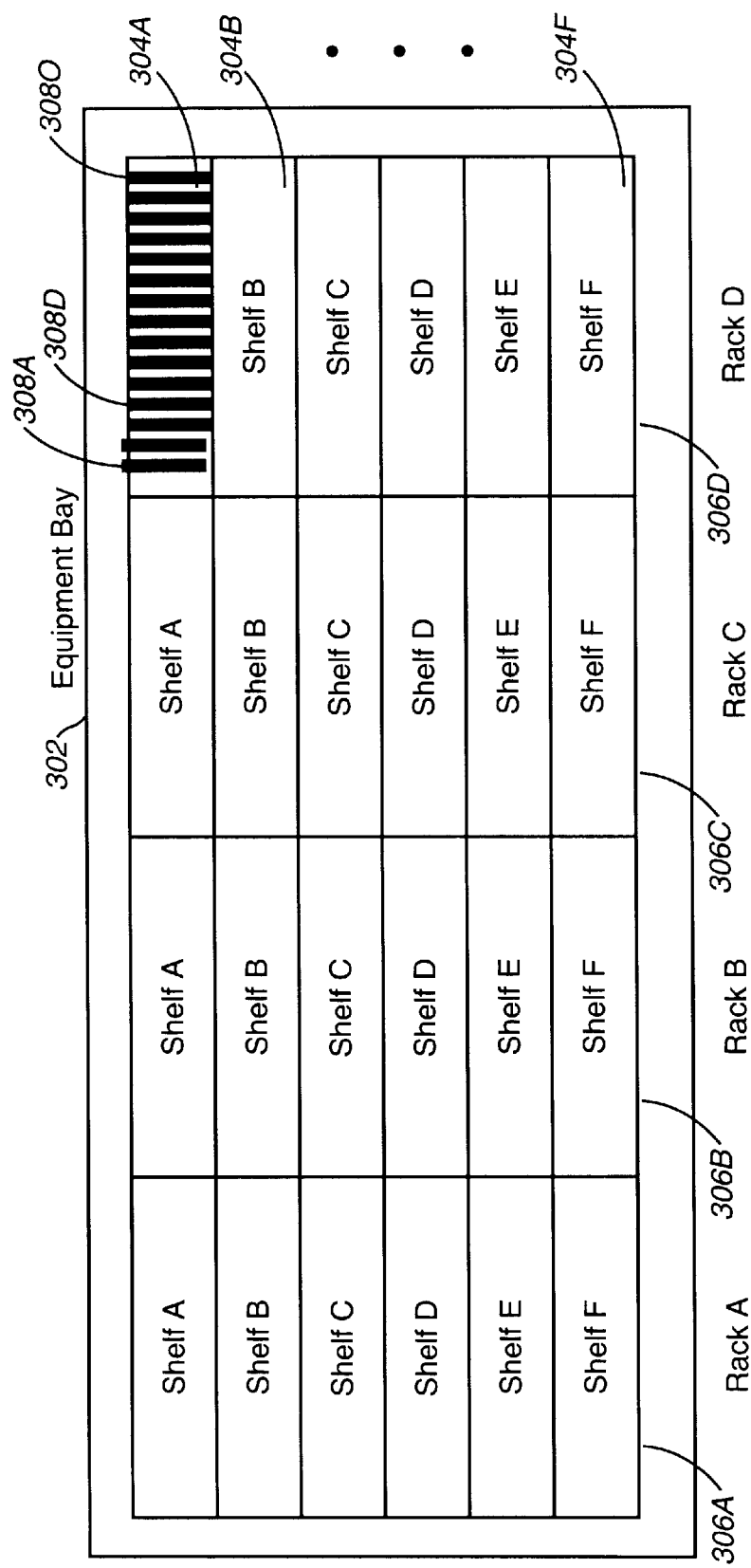
FIG. 3 illustrates an example configuration of the physical layout of a network element.

One type of object association is exemplified by a hardware containment relationship. Prior to describing a hardware containment relationship, reference is first made to FIG. 3 where an illustration of an exemplary physical layout of a network element is described. As shown in FIG. 3, an example of a network element is an equipment bay. Equipment bay 302 can be organized as a plurality of side-by-side racks 306A–306D, each having a plurality of top-to-bottom shelves 304A–304F, wherein each shelf contains a plurality of vertically mounted slots 308A–308O. Circuit packs are installed in vertically mounted slots 308A–308O.

Figure 4:
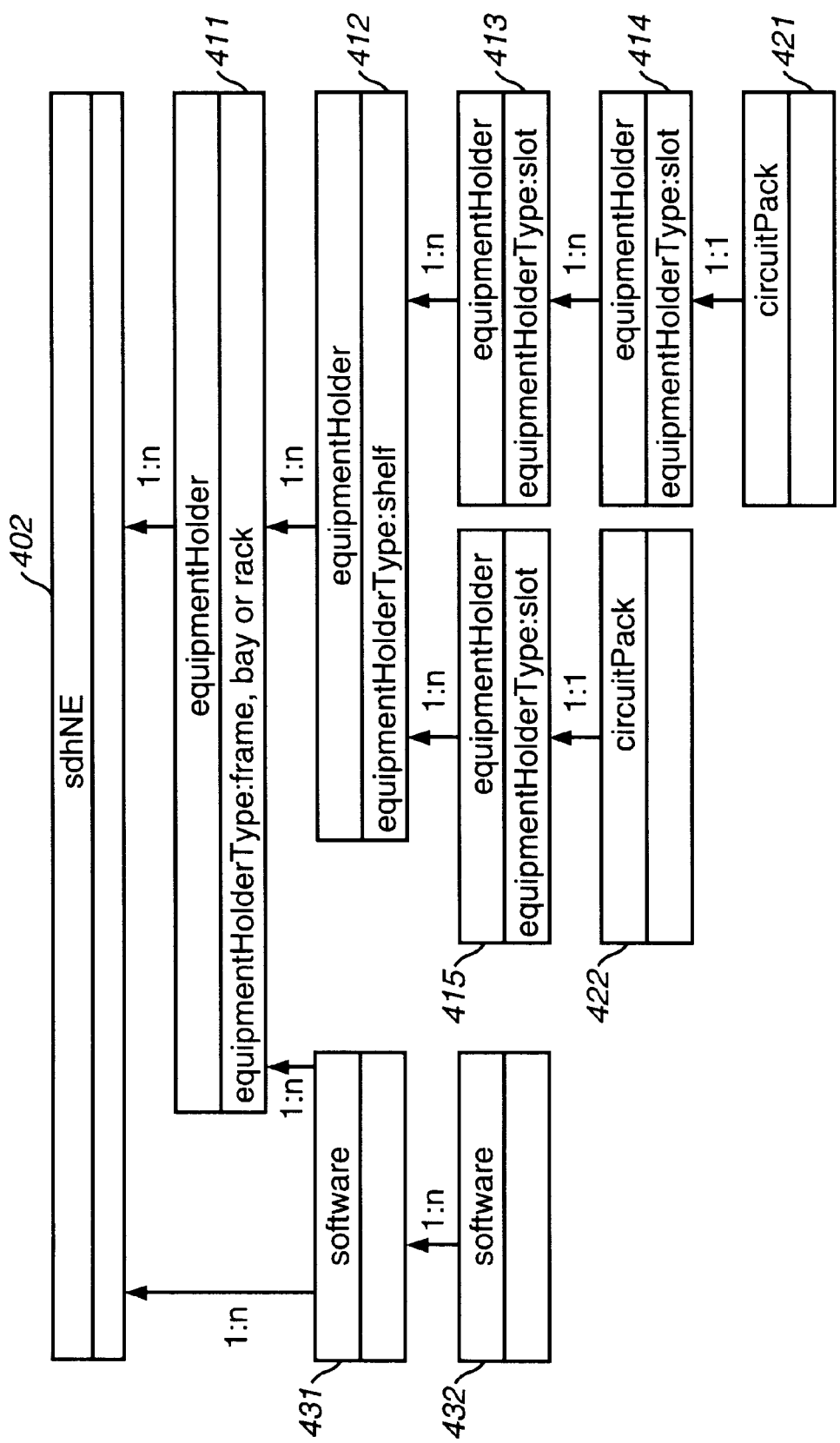
FIG. 4 illustrates a hierarchy of objects that correspond to the physical network resources of a network element.

FIG. 4 illustrates one example of a hierarchial structure of objects representing the hardware containment relationship. At the highest level, sdhNE object 402 represents the entire network element itself. With reference to the example illustration of FIG. 3, sdhNE object 402 can represent equipment bay 302 assuming that only one equipment bay exists. Contained within equipment bay 302 is a plurality of racks 306A–306D. Each of racks 306A–306D can be represented by an equipment holder object 411.

Generally, an equipment holder object can be used to represent any level of a network element's physical hierarchial structure. Each rack further includes a plurality of shelves A–F. Each shelf A–F can also be represented by an equipment holder object 412. Equipment holder object 411 is distinguished from equipment holder object 412 by the attribute equipment holder type. Within each shelf A–F, there is included a plurality of slots 308A–308O. A single slot or a subset of slots can be represented by another equipment holder object 413–415.

Continuing down the equipment hierarchy, a circuit pack object 421, 422 is used to represent a specific piece of hardware (i.e., circuit pack) that resides in a particular slot 308A–308O. Examples of different types of circuit packs include optical/electrical (O/E) converters, mappers/ multiplexers, interface cards (e.g., DS3), and power modules. As would be apparent to one of ordinary skill in the relevant art, an arbitrary numbers of levels within an equipment hierarchy can be used to represent an arbitrary piece of hardware.

As further illustrated in FIG. 4, software objects 431, 432 can also be used to represent pieces of network software. The relations between the individual pieces of software in the network element, can be used to define the specific hierarchy of software objects 431, 432.

In addition to the hardware containment described in the relationships above, a generic form of association relationship can be used to define a hierarchy of objects representing managed network resources. Managed network resources include more than simply pieces of hardware. Managed network resources can also include the logical "pipes" that carry customer circuits. These logical pipes can be defined at any signal level in the multiplex hierarchy.

Further associated with each logical pipe are termination points (i.e., ends of the logical pipe). Termination points reside in the network element that terminates a logical pipe (or connection). In this framework, an association relationship can also be used to relate a plurality of termination points. More generally, an association relationship can be used to specify a relation between a customer and the customer's circuits.

Figure 5:
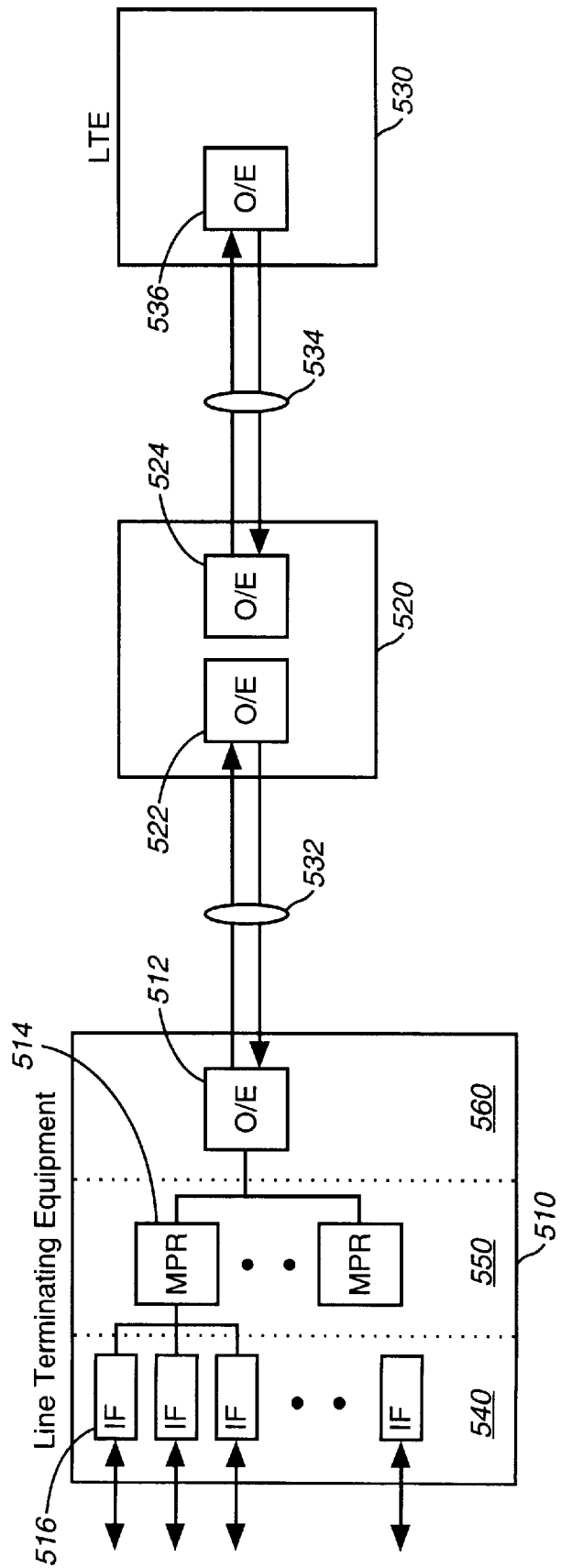
FIG. 5 illustrates an exemplary long-haul fiber-optic connection between two pieces of line terminating equipment.

FIG. 5 illustrates an example of a long-haul connection between line terminal equipment (LTE) 510 and 530 that is used to carry a plurality of customer circuits. For illustration purposes, LTE 510 is presented in the form of a high-level functional block diagram. This high level block diagram includes three separate sections 540, 550, 560. Section 540 provides an interface function and includes interface cards (IF) 516. Section 550 provides a mapping/multiplexing function as lower-rate electrical signals are combined into a higher rate signal (e.g., STS-48) for transport onto fiber optic link 532. Section 550 includes mappers (MPR) 514. Section 560 provides an optical interface function and includes optical/electrical (O/E) unit 512.

In an example configuration, a digital signal (e.g., DS3) is first received by IF 516. This digital signal is then provided to one of MPR units 514. Generally, MPR 514 converts the digital signal into a SONET/SDH format and/or multiplexes the digital signal into a higher rate digital signal. In one example, a D53 signal received by IF 516 is transformed into an STS-1 signal in the SONET hierarchy. A plurality of STS-1s can be received by MPR 514 and converted into a higher rate SONET signal (e.g., STS-12). Various stages of multiplexing can be used, but the end result is a high-rate electrical signal being provided to O/E 512 that interfaces fiber optic cable 532. O/E 512 converts the high-rate electrical signal into an optical signal and transmits it on a fiber optic cable within link 532.

Link 532 represents a general bidirectional link between LTE 510 and regenerator 520. Regenerator 520 reconditions an optical signal that is degraded due to its transmission over a long span of fiber optic cable (e.g., 25–30 miles). More specifically, after a signal is received by O/E 522 in regenerator 520, the signal is reconditioned and provided to O/E 524. O/E 524 transmits the optical signal to LTE 530 using link 534. The logical link between LTE 510 and regenerator 520 defines a regenerator section. The logical link between regenerator 520 and LTE 530 defines a second regenerator section. A regenerator section represents a part of the transport protocol where the section overhead is terminated.

The section overhead is used to monitor the status and integrity of communication between LTE 510 and regenerator 520 or regenerator 520 and LTE 530. Similarly, the link between LTE 510 and LTE 530 defines a modulated section. This modulated section represents a portion of the transport protocol where the line overhead is terminated. The line overhead is used to monitor the status and integrity of communication between LTE 510 and LTE 530.

Having described a generic example long-haul connection, an example association relationship between termination points is now described with reference to FIG. 6. Generally, a termination point is the end of a logical link. The logical link can represent a digital signal at any of a plurality of signal levels. For example, consider the different types of termination points that can exist within LTE 510. First, there exists a physical termination point at the interface between O/E unit 512 and fiber optic cable 532. Next, there is a termination point of the logical link that exists between LTE 510 and regenerator 520. As noted above, this link represents a regenerator section. In terms of the transport protocol, this termination point is defined by the removal and processing of the section overhead in the SONET/SDH frame.

Continuing in LTE 510, the next termination point is for the logical link between LTE 510 and LTE 530. This logical link represents a modulated section. In terms of the transport protocol, this termination point is defined by the removal and processing of the line overhead in the SONET/SDH frame.

At this point, is should be noted that each of the termination points thus described are for logical links that are operating at the line rate (e.g., OC-48) carried on fiber optic cables 532 and 534. Multiplexed within this OC-N signal are a plurality of lower rate signals. Each of these lower rate signals define a separate logical link and therefore have their own separate termination points. The relation between these termination points provides a type of containment association corresponding to a signal flow relationship.

Figure 6:
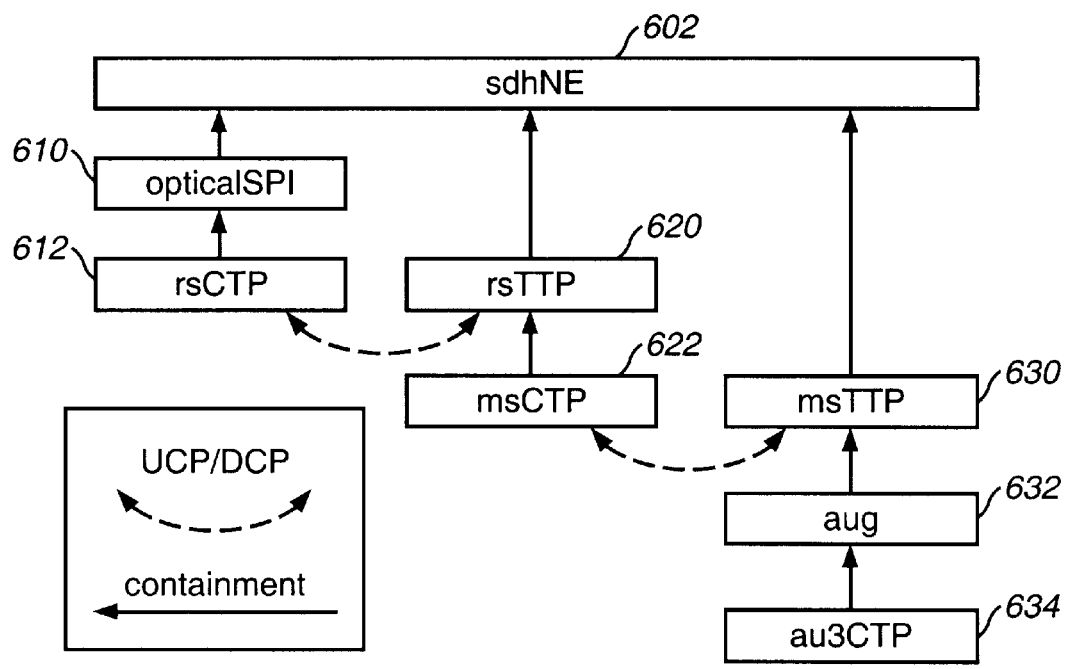
FIG. 6 illustrates a general termination point containment and signal flow relationship within a network element.

As FIG. 6 illustrates, the highest level object is sdhNE object 602. Object 602 (analogous to object F in FIG. 2) identifies the entire managed network resource represented by a managed NE 202, 204, 206. Contained within object 602 is optical SPI object 610. Object 610 corresponds to the termination point represented by the physical endpoint of fiber 532. As noted above, the physical endpoint is represented by the interface between link 532 and O/E 512. Contained within optical SPI object 610 is regenerator section connection termination point (rsCTP) object 612. Object 612 represents the point at which the regenerator section connection is terminated.

Also contained within sdhNE object 602, is regenerator section trail termination point (rsTTP) object 620. Object 620 represents the termination point of the regenerator section, or the point at which the regenerator section overhead is processed and removed. Contained within rsTTP object 620 is modulated section connection termination point (msCTP) object 622. Object 622 represents the point at which the modulated section connection is terminated. Object 620 and object 622 represent an example of a trail/connection association relationship. Generally, the trail represents a server entity for one or more connections that may be concatenated in sequence to form the trail sequence and/or bundled to form a higher-rate trail entity. The trail/connection relationship is described more fully in ITU-T recommendation G.774.

Figure 7:
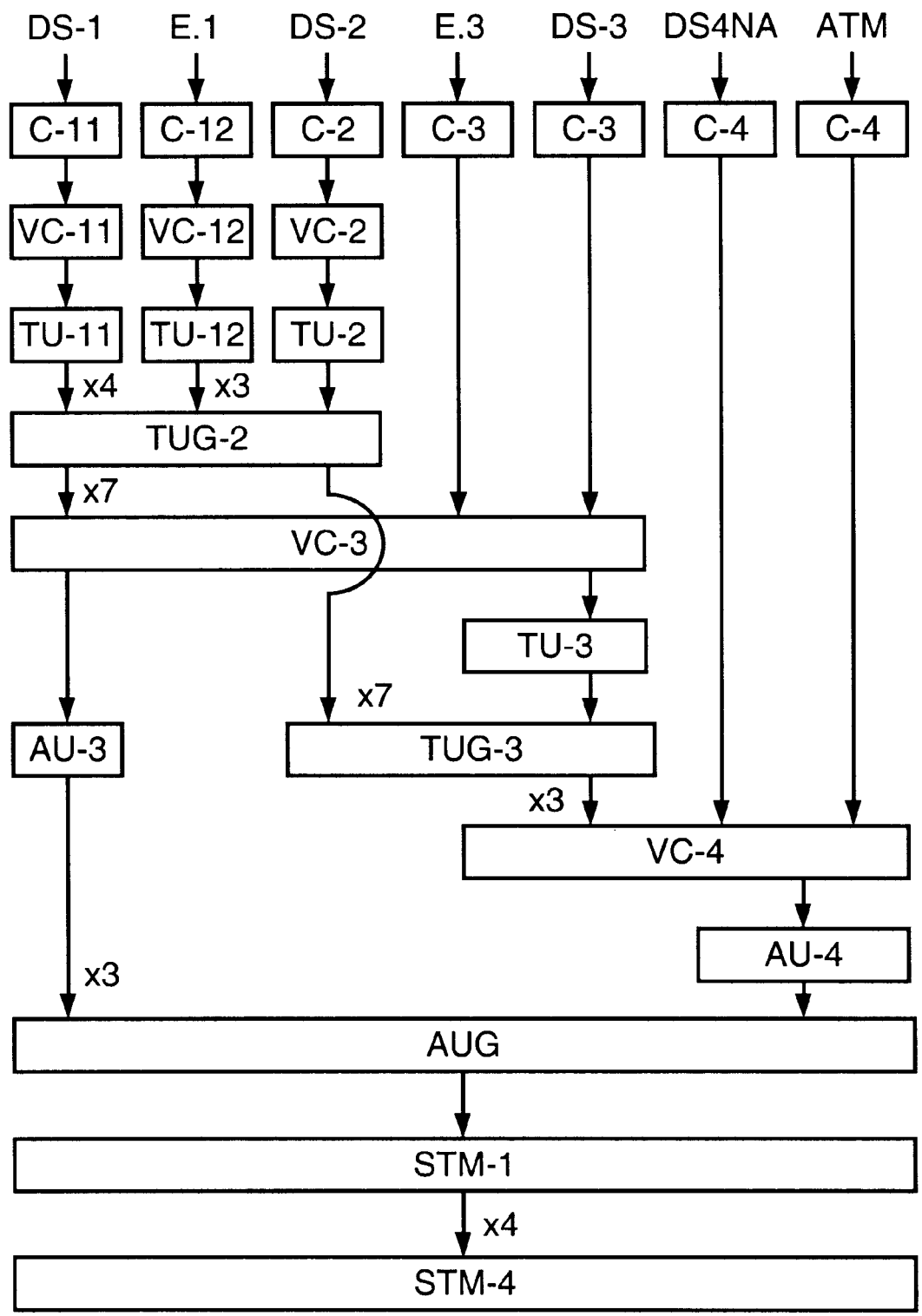
FIG. 7 illustrates a multiplex hierarchy in the synchronous digital hierarchy.

Further contained within sdhNE object 602 is modulated section trail termination point (msTTP) object 630. Object 630 represents the termination point where the line overhead is processed and removed. Contained within msTTP object 630 is aug object 632. Object 632 represents a specific sub-level in the SDH multiplex hierarchy (See FIG. 7). Similarly, au3CTP object 634 represents a further sub-level in the SDH multiplex hierarchy. The objects contained within msTTP object are dependent upon the specific multiplex configuration that is implemented. The possible levels and relationships within the SDH multiplex hierarchy are illustrated in FIG. 7.

In combination, the objects in FIG. 6 represent a general termination point containment and signal flow relationships within an exemplary network element. As described above, these objects represent multiple levels within the multiplexed hierarchy.

Figure 8:
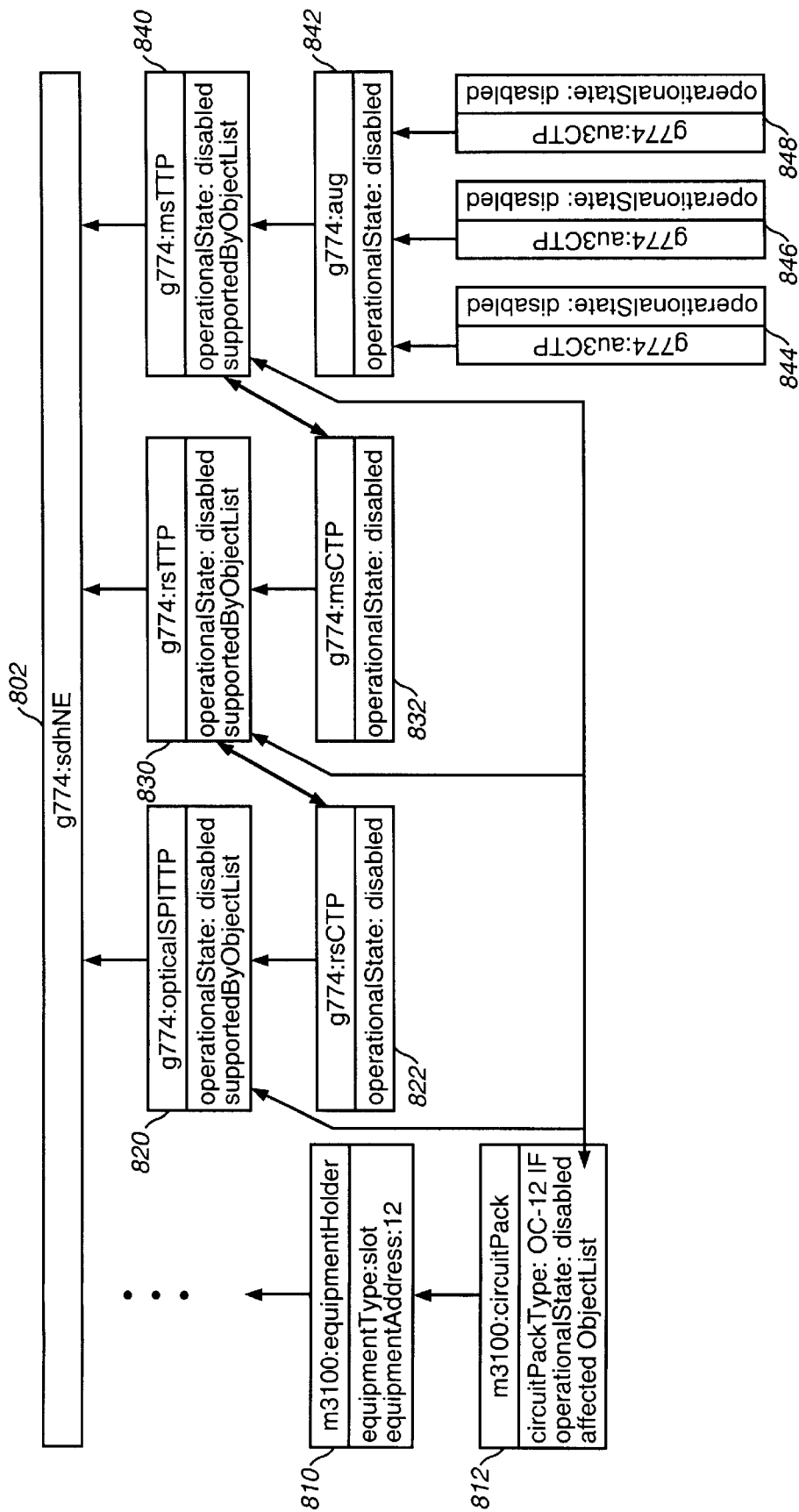
FIG. 8 illustrates an example of the propagation of state changes between objects of a network element.

FIG. 8 provides an illustration of state propagation. The object hierarchy illustrated in FIG. 8 is a combination of objects that were described previously in FIG. 4 and FIG. 6. More specifically, objects 810 and 812 illustrate a portion of the general hardware containment relationships that can exist within a network element. Similarly, objects 820, 822, 830, 832, 840, and 842 describe the general termination point containment and signal flow relationships described in FIG. 6.

Object 812 represents a specific circuit pack managed network resource. Specifically, object 812 represents an OC-12 IF circuit pack. In the context of FIG. 5, OC-12 IF circuit pack would be positioned in a similar manner to IF 516. In this case, however, IF 516 would receive a high-rate (OC-12) optical signal. This high-rate signal is converted to an electrical signal (STS-12) and provided to mapper 514. The STS-12 signal is combined with other signals to produce a high-rate signal that is eventually converted into an OC-N signal by O/E unit 512.

To illustrate an example of object state propagation, consider a scenario wherein a OC-12 IF circuit pack interface card is either removed or fails due to a powering problem. In this case, the intelligence of object 812 determines that the current internal state of object 812 should be changed from a state of enabled to a state of disabled. Based upon this change of state, object 812 will issue a state change notification to all of the objects identified by the affected-object-list. Generally, the affected_object_list identifies the external objects which can be affected by an object's internal change of state. In the context of FIG. 8, it is assumed that the affected_object_list of object 812 includes pointers to object 820, 830 and 840.

Based upon the receipt of a state change notification from circuit pack object 812, each of objects 820, 830 and 840 will correspondingly make an internal determination concerning the impact of the state change of object 812. Assume that each of objects 820, 830 and 840 represent a logical termination point within an OC-48 connection. Once the OC-12 IF circuit pack represented by object 812 fails, then at least one-fourth of the traffic within the OC-48 connection will also fail. Each of objects 820, 830 and 840 could therefore make a similar internal state change from one of enabled to one of disabled (or degraded). With reference to FIG. 2, the state change notification issued from object 812 to 820 could be represented by the state change propagation from object A to object E in managed NE 204.

Note that further state change notifications would also exist within the scenario of FIG. 8. For example, circuit pack object 812, upon an internal state change from enabled to disabled, would also send a state change notification to equipment holder object 810. Similar state change notifications could propagate up the object hierarchy chain until sdhNE object 802 is reached. Note that propagation can proceed in the downard direction. Similarly, each of objects 820, 830 and 840 would also submit a state change notification to sdhNE object 802 upon their own internal state change from one of enabled to one of disabled (or degraded). In the context of FIG. 2, this is illustrated by objects C, D, and E also submitting state change notifications to object F. Once the highest level object is reached (i.e., sdhNE object 802 or object F in manage NE 204), then a state change notification can be issued to an object in a higher level in the network management system. The object in the higher level in the network management system can represent a network or service level managed network resource. Note that sdhNE object 802 can also propagate a state change notification to an object (not shown) that is contained within sdhNE object 802.

Figure 9:
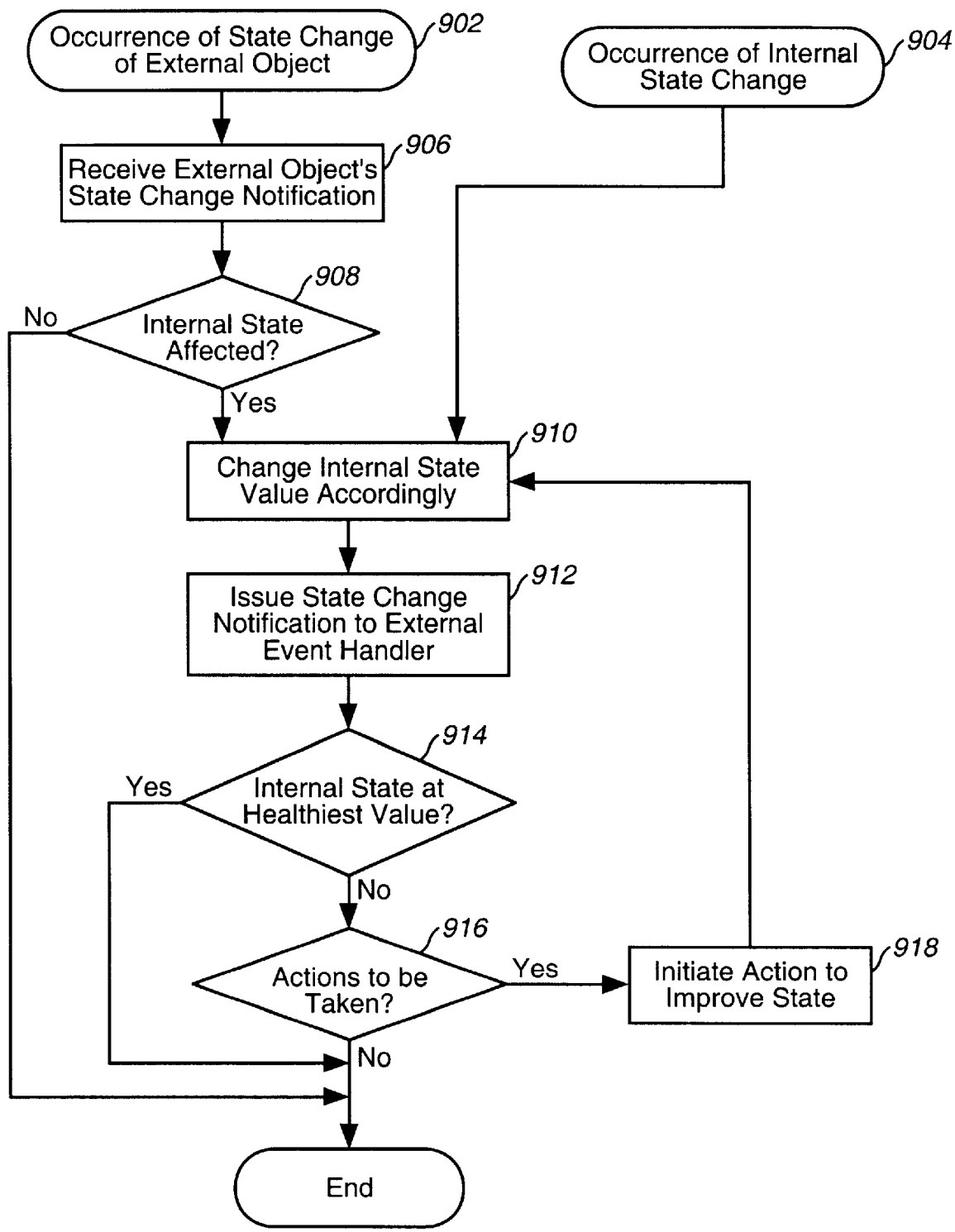
FIG. 9 illustrates a flow chart of the intelligence contained within each object.

FIG. 9 illustrates a flowchart that exemplifies the type of internal processing that is performed by each object. This internal object processing represents a part of the distributed intelligence contained within the various objects. With this distributed intelligence, each object functions to determine its own internal state and provide any state changes to other potentially affected objects. As noted in the context of the example of FIG. 8, the distributed state management process propagates state changes between objects in the managed NEs or to objects in other layers of the network management system.

As noted, each object is generally responsible for managing/updating its own internal state. If a state change occurs, the object then identifies one or more other objects that can be potentially affected. Each potentially affected object will receive a state change notification and will determine if the state change occurring in the supporting object results in a state change to itself. If the object determines that its state is changed due to the supporting object's state change, it updates its state and continues the propagation process. This update of object state and forwarding of state change notifications continues until there is an object whose state is unaffected by the supporting object's state change, or there are no other objects that are potentially affected.

The process of FIG. 9 begins upon the occurrence of one of conditions 902 and 904. Condition 904 is exemplified in FIG. 2 as a spontaneous change in state in object A. One example of this type of internal state change is illustrated by object 812 in FIG. 8. If the circuit pack represented by object 812 is pulled from its shelf slot, circuit pack object 812 will undergo a spontaneous state change from enabled to disabled.

Condition 902, on the other hand, represents a part of the propagation of state change notifications. An illustration is provided in FIG. 2 where an external state change in object A is brought to the attention of object D. The reception of a state change notification is represented in FIG. 9 by step 906. Upon receipt of state change notification, the object will then make its own internal determination as to the possible effect of an external state change upon its own internal state. This determination process is represented by step 908 and is implementation dependent.

If an object's own internal state is not affected by an external state change, the process ends. No further state change notifications will be propagated by that object. As an example, consider object F in managed NE 204 of FIG. 2. Object F receives state change notifications from objects C, D, and E. If based upon these three external state change notifications, object F determines that no internal state change is required, then object F will not forward any state change notifications to any further objects.

If, on the other hand, an object determines in step 908 that its own internal state is affected, then that object will first change its internal state to a new value. As noted above, a simple example of a state change is a change from enabled to disabled. This process of changing an object's internal state is represented by step 910. After an object's internal state is changed, the object will then identify those objects which could be affected by its internal state change. With reference to FIG. 8, this list of objects that could be affected is represented by the affected_object_list. In one embodiment, subsequent state change notifications are issued to an external event handler. This process is represented by step 912. Generally, the event handler serves to route state change notifications to their proper destinations. In other embodiments, the state change notifications are issued directly to the destination object.

Next, in step 914, the object makes a determination concerning whether its internal state is at its healthiest value. In the example configuration where the internal state can have a value of enabled, disabled, or degraded below service level agreement with an associated customer, the enabled state value represents the healthiest value. The state values of disabled and degraded below service level agreement can both be improved to the enabled state.

If the object's state is at its healthiest value, the process then ends since no further action is required (e.g., state change from disabled to enabled). Conversely, if the internal state is not at its healthiest value, then the object makes internal determinations concerning whether further actions can be taken. This determination is represented by step 916. If further actions can be taken, the process continues to step 918 where those actions are initiated. One example of a type of action that can be initiated to improve an object's state is a protection switch. Generally, a protection switch is operative to move a piece of traffic from a network path that has failed to one that is fully functioning. After the action initiated in step 918 is completed, the process loops back to step 910 where the internal state value of the object is changed accordingly. Specifically, if the corrected actions served to repair the problem, the object may have changed state from disabled to enabled. This state change will again be issued in a state change notification represented in step 912.

Generally, the process illustrated in FIG. 9 identifies a form of distributed intelligence within the objects. The objects are therefore more than simply holders of information. Rather, they function autonomously by propagating state information between themselves, determining their own state and taking action to improve their own state. This enables an accurate and timely identification of the working condition of the various managed network resources. Again, this process illustrates a general paradigm shift away from alarm management.

Figure 10:
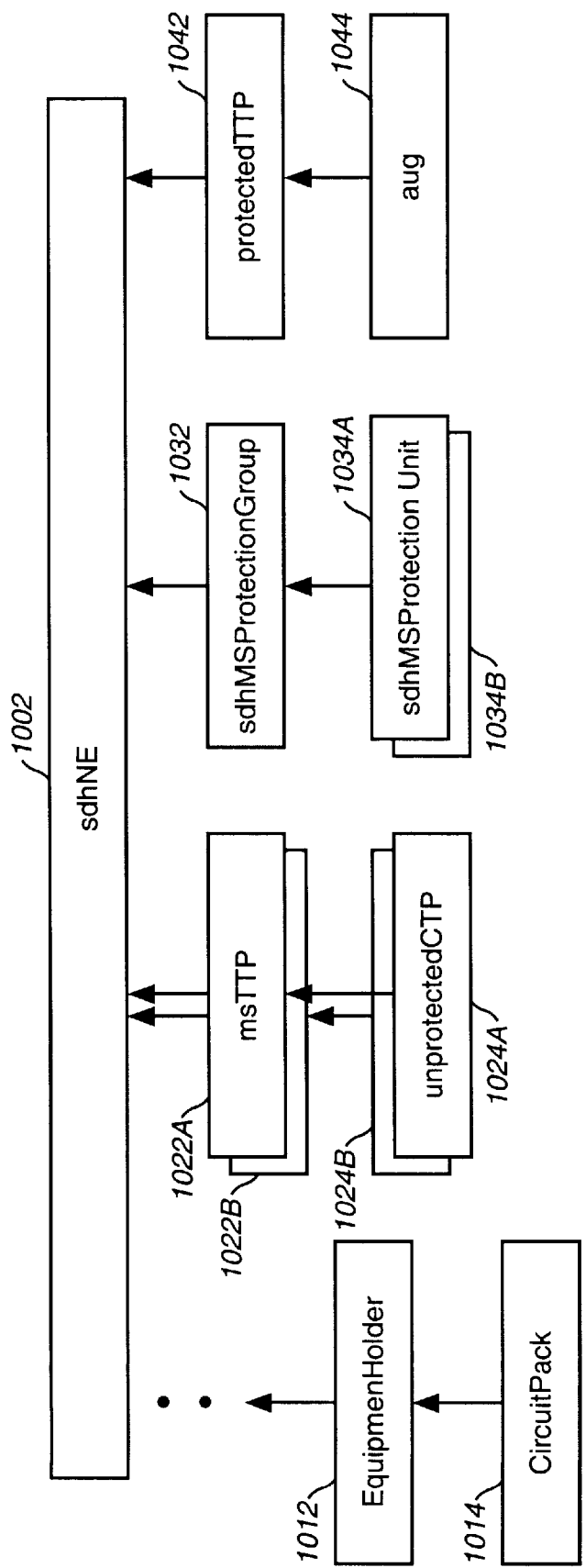
FIG. 10 illustrates a hierarchy of objects that control an automatic protection switch.

With reference to FIG. 10, another example of the role of distributed intelligence is provided. In this object model, objects 1012 and 1014 illustrate a similar hardware containment relationship that was described above. The remaining objects define a standard protection configuration naming/containment relationships for the network resources that are used in effecting a protection switch. This relationship is described in greater detail in ITU-T recommendation G.774, Amendment 3.

Generally, a protection switching system can be implemented in a variety of ways. In one configuration, a protection channel is provided for each working channel. Here, a channel is used to describe the logical link defined by a modulated section (See FIG. 5). This configuration represents a dedicated (1+1) protection scenario.

In other scenarios, a single protection channel can be used to protect a set of N working channels. This 1:N protection system provides a more efficient use of network resources. More generally, M protection channels can be used to protect a set of N working channels. This configuration is referred to as a M:N protection system.

The hierarchy of objects in FIG. 10 illustrates a dedicated (1+1) configuration. This (1+1) configuration includes a working channel system and a protection channel system. Both the working channel system and the protection channel system include the components used to create the logical link defined by the modulated section. The modulated section is the logical link of interest because SONET/SDH systems are switched at the modulated section level rather than the regenerator section level. In the context of FIG. 5, each set of components would include elements analogous to O/E units 512, 522, 524 and 532.

Objects 1022A, 1022B correspond to each of the working and protection channels (i.e., modulated sections), respectively. Contained within each msTTP object 1022A to 1022B is an unprotected CTP object 1024A, 1024B, respectively. Unprotected CTP objects 1024A, 1024B represent the overall set of channels that are available within the NE. As noted above, the total number of channels includes one working channel and one protection channel. If a general M:N protection system was being modeled, there would exist (M+N) msTTP objects 1022 and (M+N) unprotected CTP objects 1024.

Conversely, protected TTP object 1042 represents the sole protected channel (i.e., the working channel). The protection channel is not included in this set because it is the channel providing the protection, not the channel that is being protected. In a general M:N protection system, there would be M protected TTP objects 1042. As each protected TTP object 1042 represents a portion of a working, or live network resource, each protected TTP object 1042 has further contained within it objects representing sublevels of multiplexed traffic. As illustrated in FIG. 7, AUG object 1044 represents a sublevel in the multiplex hierarchy. For simplicity, only one sublevel in the multiplexed hierarchy is shown. Clearly, additional multiplex sublevels can be further contained within AUG object 1044.

Further contained within sdhNE object 1002 is sdhMS protection group object 1032. Object 1032 generally represents the network resource that coordinates the protection switching amongst the working and protection channels. Contained within sdhMS protection group object 1032 are sdhMS protection unit objects 1034A, 1034B. Each of sdhMS protection unit objects 1034A, 1034B represents the network resource responsible for controlling the protection switch for a channel in the set of working and protection channels. In the model of FIG. 10, sdhMS protection unit objects 1034A, 1034B correspond to the working and protection channels, respectively.

Figure 11A:
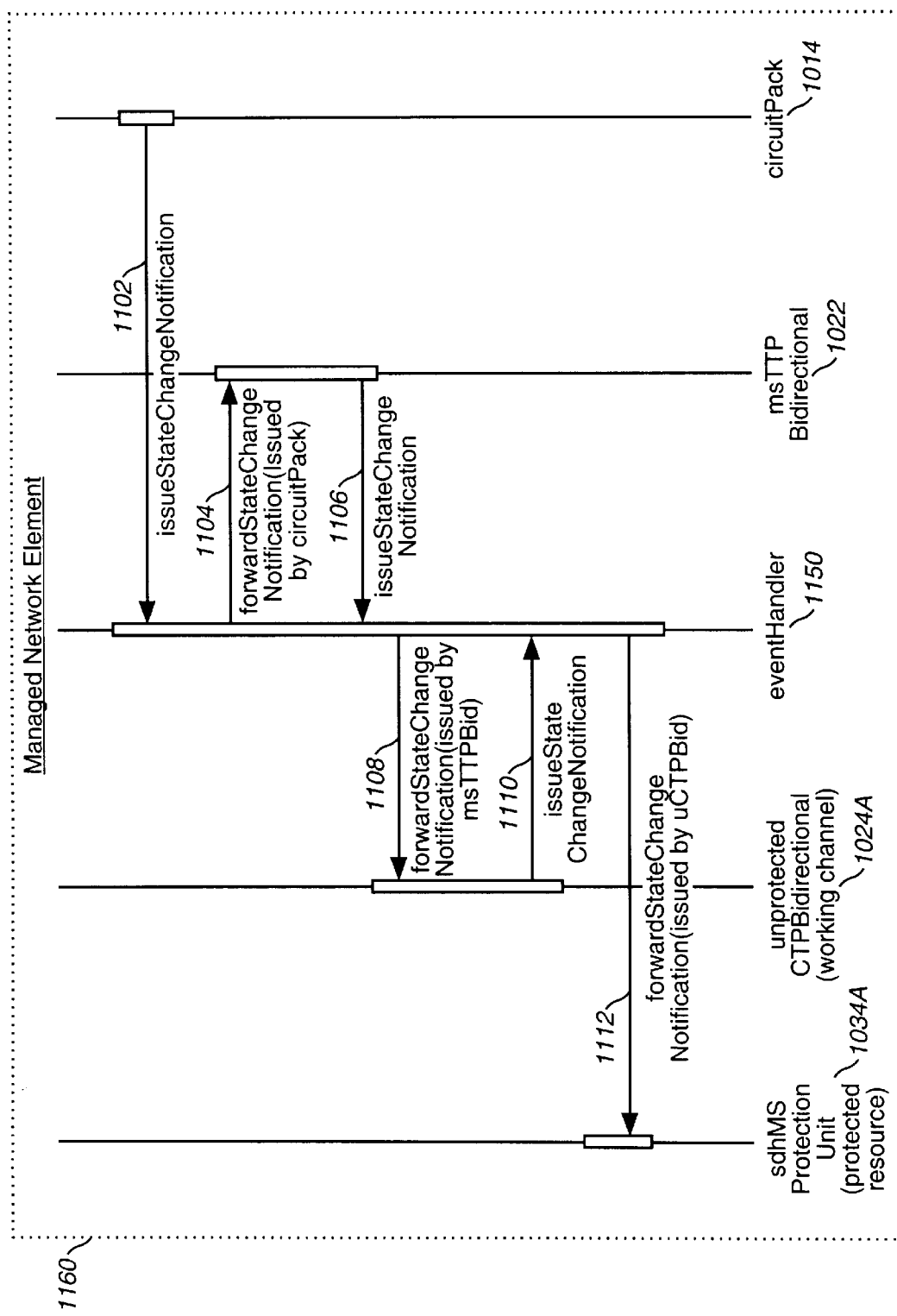
FIGS. 11A, 11B, and 11C is an object interaction diagram that illustrates the interaction between the objects that control an automatic protection switch.
Figure 11B:
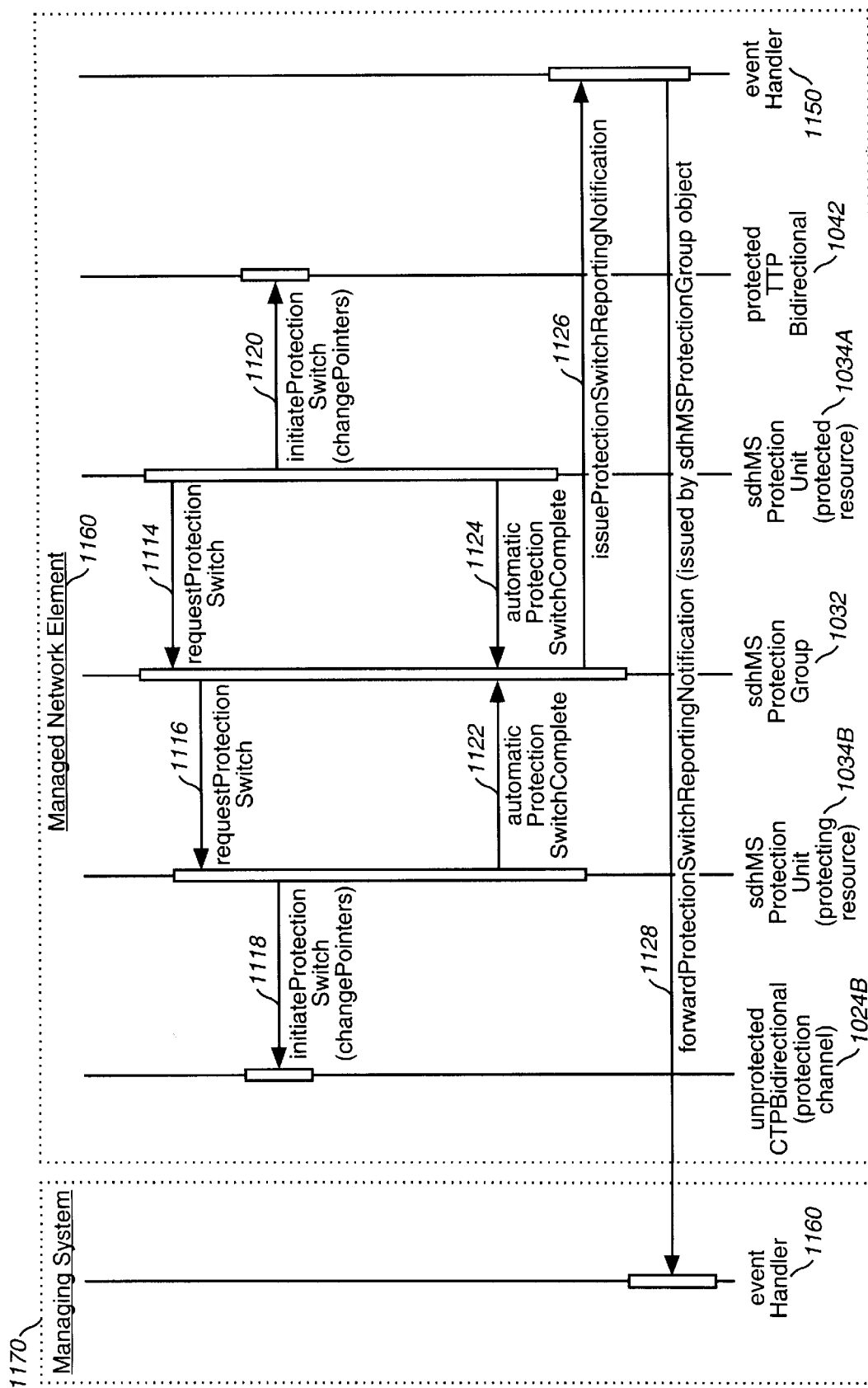
Figure 11C:
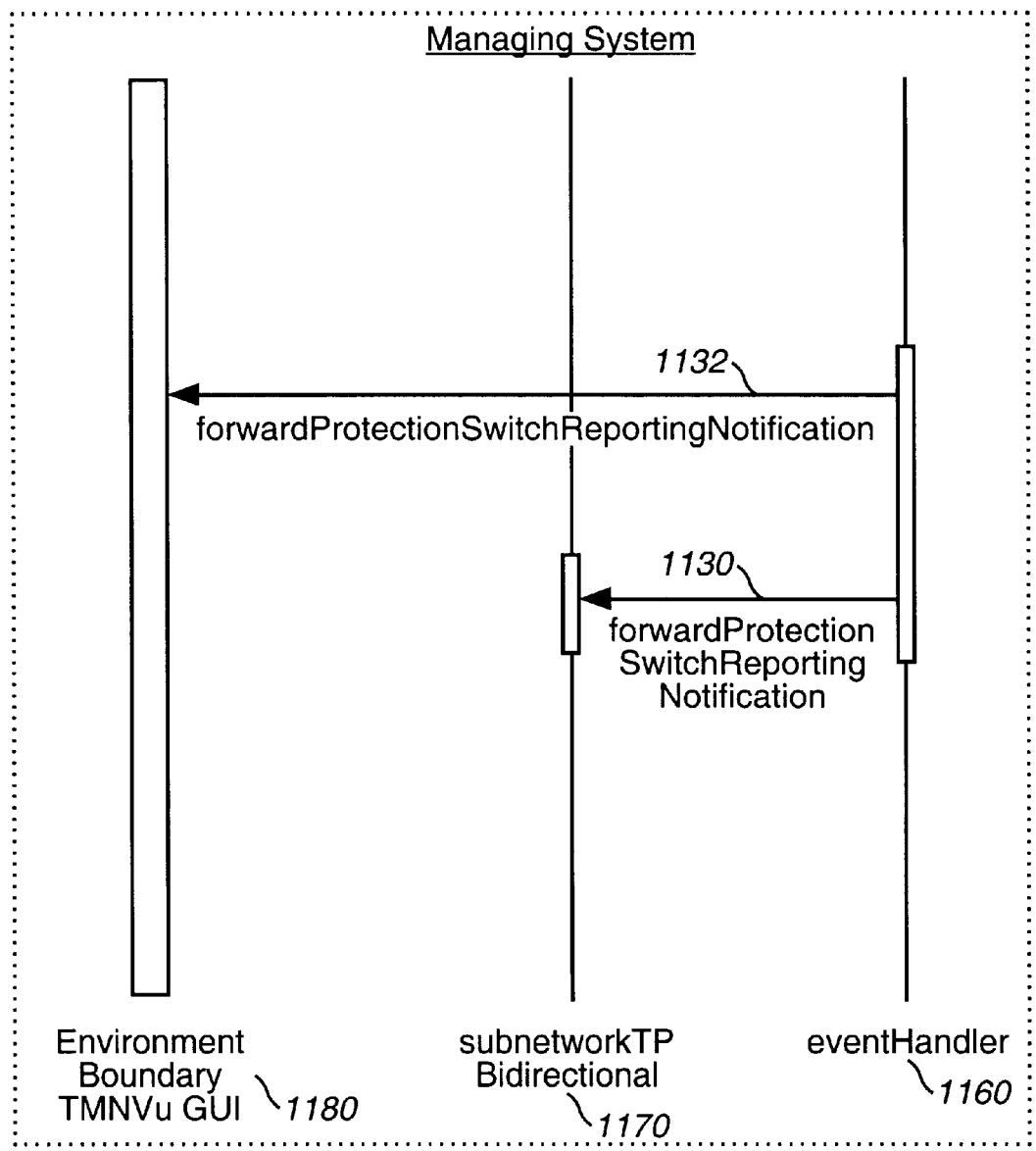

The control of a protection switch through the distributed intelligence and state management of the objects in FIG. 10 is now provided with reference to FIGS. 11A–11C. This protection switching scenario begins upon the detection of a circuit pack failure (e.g., circuit pack pulled from its slot). This circuit pack failure would cause circuit pack object 1014 to change state from enabled to disabled. As a result of this state change, circuit pack object 1014 issues a state change notification to msTTP bidirectional object 1022A. In one embodiment, this state change notification is issued msTTP bidirectional object 1022A via event handler object 1150 in managed element 1160. Event handler object 1150 routes state change notifications amongst a plurality of objects. In this particular instance, event handler object 1150 forwards the state change notification to msTTP bidirectional object 1022A. The propagation of a state change notification from circuit pack object 1014 to msTTP object 1022A is represented by steps 1102 and 1104.

Upon receipt of the state change notification from circuit pack object 1014, msTTP object 1022A makes its own internal determination concerning the effect of the circuit pack object's state change. Any consequent state change is forwarded from msTTP object 1022A to unprotected CTP object 1024A. This propagation is effected via event handler 1150 and is represented by steps 1106 and 1108.

In a similar manner, unprotected CTP object 1024A makes its own determination concerning a potential state change. Upon its own state change, unprotected CTP object 1024A issues a state change notification to the subscribing sdhMS protection unit object 1034A. This is represented by steps 1110 and 1112. Protection unit 1034A is the protection unit dedicated to handle protection switches for the working channel.

Continuing in FIG. 11B, sdhMS protection unit 1034A then issues a request to sdhMS protection group object 1032 for the execution of an automatic protection switch (i.e., switching traffic from the working channel to the protection channel). This is represented by step 1114. Note that this request is forwarded to sdhMS protection group object 1032 via event handler 1150. For convenience, however, the messaging of FIG. 11B is illustrated as flowing directly between the objects.

Next, sdhMS protection group object 1032 identifies sdhMS protection unit object 1034B as the protecting or backup resource and issues a protection switch request to sdhMS protection unit object 1034B. The protection switch request is illustrated by step 1116.

As illustrated by step 1118, sdhMS protection unit object 1034B executes its part of the protection switch by requesting that the unprotected CTP object 1024B switch its connectivity to protected TTP object 1042. Similarly, as illustrated in step 1120, sdhMS protection unit 1034A also executes its part of the protection switch by requesting that the protected TTP object 1024A switch its connectivity to unprotected CTP object 1024B. In combination, steps 1118 and 1120 effect the protection switch from a working channel to a protection channel.

Upon completion of the protection switch, each of sdhMS protection units 1034A, 1034B submits an automatic protection switch complete message to sdhMS protection group object 1032. This is represented by steps 1122 and 1124. Object 1032 then issues a protection switch reporting notification to event handler 1150. Even handler 1150 forwards the protection switch reporting notification to objects in a higher level of the network management system. This propagation of notification is represented by steps 1126 and 1128.

As illustrated in FIG. 11C, the final destinations of the issued protection switch reporting notification is subnetwork TP object 1170 and environment boundary TMNVU GUI object 1180. Generally, GUI object 1180 can trigger subsequent human or automated system interaction to investigate/resolve the cause of the protection switch.

As noted in the previous example, the event handler handles a significant part of the state change propagations and notifications. It is important to note that the event handler object as shown serves only as an example. Distribution of events and notifications between objects may be implemented in a variety of ways. For the purposes of this discussion, it is only important that object notifications be communicated from one object to another such that objects are able to use information provided by other objects. This information can be used to determine any impact on an object's state, acts the object should initiate, etc.

It should also be noted that it is not necessary for the NE to contain the intelligence to manage the state of its subtending network resources. Indeed, the first layer of the management system can be designed to compensate for a NE which lacks significant intelligence by processing alarms and deriving the state of the NE's managed network resources.

It should further be noted that objects are not necessarily required in implementing the present invention. Rather, an object can be replaced with a generic entity that includes a unit of information. This entity is used to represent a portion or aspect of a managed network resource. The interrelationship between the entities will mirror those of the objects described above. In this generic scenario, the entities can be brought into a single software application, thereby reducing to some extent their autonomy. In comparison, objects exist effectively as independent applications. The general advantages of an object are that the code and the data records will be in one place and associated very tightly. This increases the relative granularity of objects as compared to a generic software entity.

Figure 12:
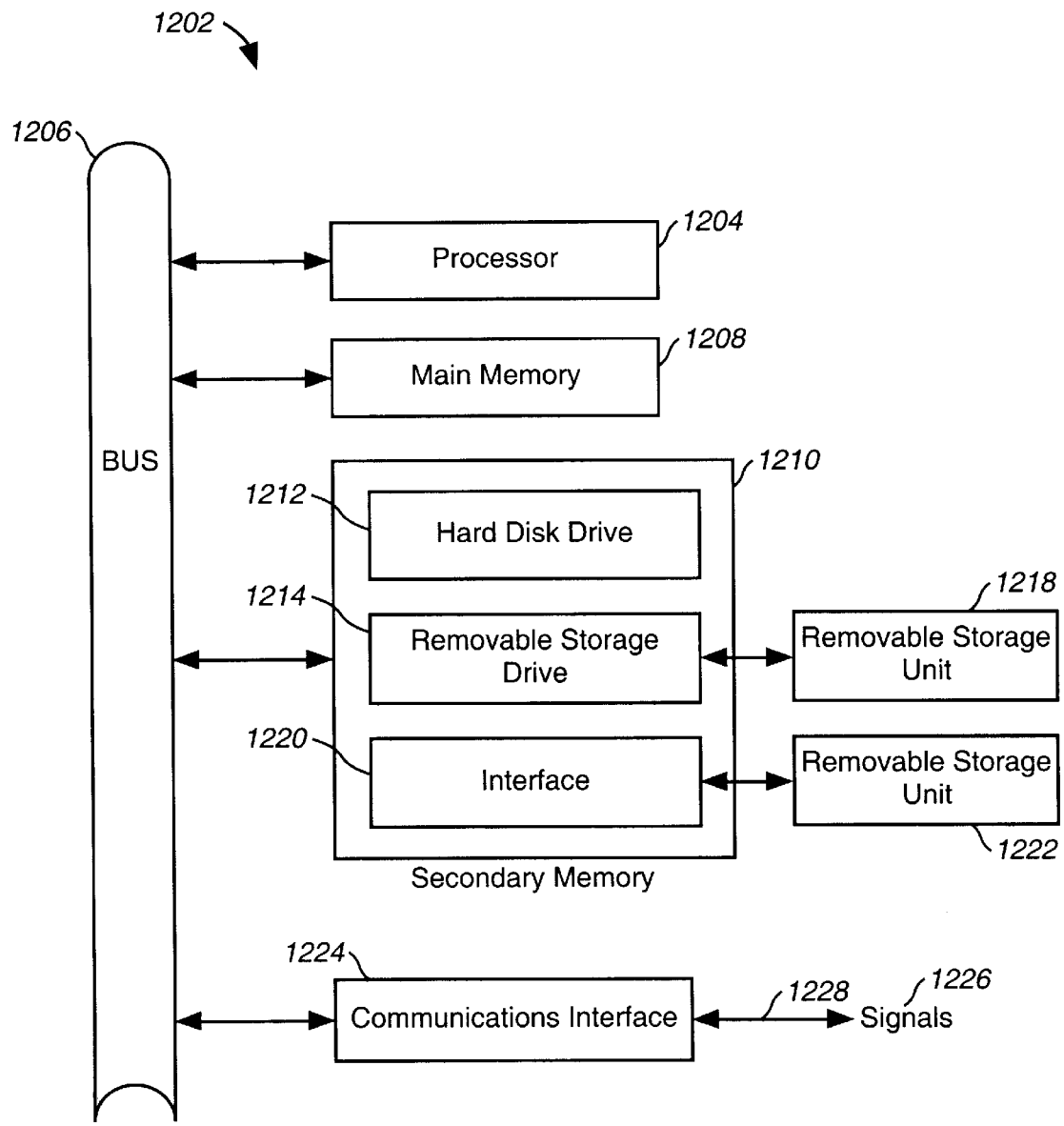
FIG. 12 illustrates a block diagram of a computer useful for implementing elements of the present invention.

The present invention may be implemented using hardware, software or a combination thereof and may be implemented in a computer system or other processing system (e.g., network element). In fact, in one embodiment, the invention is directed toward a computer system capable of carrying out the functionality described herein. An example computer system 1202 is shown in FIG. 12. The computer system 1202 includes one or more processors, such as processor 1204. The processor 1204 is connected to a communication bus 1206. Various software embodiments are described in terms of this example computer system. After reading this description, it will become apparent to a person skilled in the relevant art how to implement the invention using other computer systems and/or computer architectures.

Computer system 1202 also includes a main memory 1208, preferably random access memory (RAM), and can also include a secondary memory 1210. The secondary memory 1210 can include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218, represents a floppy disk, magnetic tape, optical disk, etc. which is read by and written to by removable storage drive 1214. As will be appreciated, the removable storage unit 1218 includes a computer usable storage medium having stored therein computer software and/or data.

In alternative embodiments, secondary memory 1210 may include other similar means for allowing computer programs or other instructions to be loaded into computer system 1202. Such means can include, for example, a removable storage unit 1222 and an interface 1220. Examples of such can include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1218 to computer system 1202.

Computer system 1202 can also include a communications interface 1224. Communications interface 1224 allows software and data to be transferred between computer system 1202 and external devices. Examples of communications interface 1224 can include a modem, a network interface (such as an Ethernet card), a communications port, a PCMCIA slot and card, etc. Software and data transferred via communications interface 1224 are in the form of signals which can be electronic, electromagnetic, optical or other signals capable of being received by communications interface 1224. These signals 1226 are provided to communications interface via a channel 1228. This channel 1228 carries signals 1226 and can be implemented using wire or cable, fiber optics, a phone line, a cellular phone link, an RF link and other communications channels.

In this document, the terms "computer program medium" and "computer usable medium" are used to generally refer to media such as removable storage device 1218, a hard disk installed in hard disk drive 1212, and signals 1226. These computer program products are means for providing software to computer system 1202.

Computer programs (also called computer control logic) are stored in main memory and/or secondary memory 1210. Computer programs can also be received via communications interface 1224. Such computer programs, when executed, enable the computer system 1202 to perform the features of the present invention as discussed herein. In particular, the computer programs, when executed, enable the processor 1204 to perform the features of the present invention. Accordingly, such computer programs represent controllers of the computer system 1202.

In an embodiment where the invention is implemented using software, the software may be stored in a computer program product and loaded into computer system 1202 using removable storage drive 1214, hard drive 1212 or communications interface 1224. The control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While the invention has been particularly shown and described with reference to preferred embodiments thereof, it will be understood by those skilled in the relevant art that various changes in form and details may be made therein without departing from the spirit and scope of the invention.

What is claimed is:

1. An automated layered network management system, comprising:
  a network including
    a first layer comprising a plurality of network elements, each of said plurality of network elements comprises a first plurality of objects;
    a second layer comprising a second plurality of objects; and
    means for providing communication between one of said first plurality of objects and one of said second plurality of objects, wherein intelligence facilitating communication is distributed to said first and second plurality of objects by incorporating intelligence within said first and second plurality of objects, whereby said intelligence enables each of said first and second plurality of objects to proactively initiate at least one of network management and protection actions;
  wherein a first object of said first plurality of objects in one of said plurality of network elements includes an affected object list, wherein said affected object list identifies objects that are affected by a particular change in state of said first object, wherein said particular change in state is initiated by said first object when said first object determines that a malfunction has occurred in at least one of said plurality of network elements.

2. The system according to claim 1, wherein:
  said first object includes a supported by object list, wherein said supported by object list identifies if a state of said first object is affected by receipt by said first object of a change in state message indicating a change in state of a second object, wherein said first object initiates a change in state of said first object when said first object receives a change in state message indicating a change in state of said second object and said first object determines that said change in state of said second object affects said state of said first object, and
  when said first object determines that a malfunction has occurred in at least one of said plurality of network elements, said first object determines an action to be taken to repair said malfunction.

3. The system according to claim 1, wherein:
  no one of said first plurality of objects in any one of said plurality of network elements communicates directly with another one of said first plurality of objects in a different one of said plurality of network elements.

4. An automated layered network management system, comprising;
  a network comprising
    a first layer comprising a plurality of network elements, each of said plurality of network elements including a first plurality of objects;
    a second layer including a second plurality of objects; and
  means for providing communication between one of said first plurality of objects and one of said second plurality of objects, wherein intelligence facilitating communication is distributed to said first and second plurality of objects by incorporating intelligence within said first and second plurality of objects, whereby said intelligence enables each of said first and second plurality of objects to proactively initiate at least one of network management and protection actions;
  wherein a first object in one of said plurality of network elements includes a supported by object list, wherein said supported by object list identifies if a state of said first object is affected by receipt by said first object of a change in state message indicating a change in state of a second object, wherein said first object initiates a change in state of said first object when said first object receives a change in state message indicating a change in state of said second object and said first object determines that said change in state of said second object affects said state of said first object.

5. A state management method for objects in an automated layered network management system, comprising the steps of:

(1) receiving, by a first object with intelligence incorporated within said first object, a first state change notification from a second object with intelligence incorporated within said second object, said first state change notification identifying a change in state of said second object, said change in state of said second object initiated by said second object in response to a change in status of a managed network resource corresponding to said second object, whereby said intelligence enables each of said first and second plurality of objects to proactively initiate at least one of network management and protection actions;

(2) determining, by said first object, whether said change in state identified by said first state change notification received from said second object affects a state of said first object;

(3) initiating, by said first object, a change in state of said first object when it is determined that said first state change notification received from said second object affects a state of said first object;

(4) selecting, by said first object, at least one other object which is affected by a particular change in state of said first object, said step (4) including the step of examining an affected object list, said first object including said affected object list which identifies objects that are affected by said particular change in state of said first object; and (5) sending, by said first object, a second state change notification to said at least one other object identifying a state change of said first object.

6. The method according to claim 5, wherein said step (2) further comprises the step of examining a supported by object list, said first object including said supported by object list which identifies if a state of said first object is affected by receipt by said first object of said first state change notification received identifying a change in state of said second object.

7. A state management system for objects in an automated layered network management system, comprising:

means for receiving, by a first object, a first state change notification from a second object, said first state change notification identifying a change in state of said second object, said change in state of said second object initiated by said second object in response to a change in status of a managed network resource corresponding to said second object, wherein said first and second objects have intelligence incorporated within each of said first and second objects, whereby said intelligence enables each of said first and second plurality of objects to proactively initiate at least one of network management and protection actions:

means for determining, by said first object, whether said change in state identified by said first state change notification received from said second object affects a state of said first object;

means for initiating, by said first object, a change in state of said first object when it is determined that said first state change notification received from said second object affects a state of said first object;

means for selecting, by said first object, at least one other object which is affected by a particular change in state of said first object, said means for selecting including means for examining an affected object list, said first object including said affected object list which identifies objects that are affected by said particular change in state of said first object; and means for sending, by said first object, a second state change notification to said at least one other object identifying a state change of said first object.

8. The system according to claim 7, wherein said means for determining further comprises:

means for examining a supported by object list, said first object including said supported by object list which identifies if a state of said first object is affected by receipt of said first object of said first state change notification identifying a change in state of said second object.

9. The method according to claim 5, wherein said step (1) comprises the step of receiving said first state change notification from said second object, said first state change notification identifying said change in state, said state having a value from a set that includes values of enabled and disabled.

10. The method according to claim 5, wherein said step (1) comprises the step of receiving said first state change notification from said second object, said first state change notification having a confidence factor that indicates a reliability of the state information.

11. The method according to claim 5, wherein said step (5) comprises the step of sending said second state change notification to at least one other object in a different network management system layer from said first object.

12. The method according to claim 5, further comprising the step of initiating a network management function.

13. The method according to claim 5, further comprising the step of determining whether said state of said first object is at a healthiest value.

14. The method according to claim 9, further comprising the step of initiating an action to improve said state of said first object if said state is at one of a disabled value and a degraded value.

15. The system according to claim 7, wherein said state of said first object has a value from a set that includes values of enabled and disabled.

16. The system according to claim 7, wherein said first state change notification includes a confidence factor that indicates a reliability of state information.

17. The system according to claim 7, wherein said at least one other object is in a different network management system layer from said first object.

18. The system according to claim 7, further comprising means for initiating a network management function.

19. The system according to claim 7, further comprising means for determining whether said state of said first object is at a healthiest value.

20. The system according to claim 19, further comprising means for initiating an action to improve said state of said first object if said state is at one of a disabled value and a degraded value.

* * * * *